United States Patent Office

2,990,397
Patented June 27, 1961

---

2,990,397
SYNTHETIC TANNING AGENTS AND A PROCESS FOR PRODUCING SAME
Charles A. Fetscher, Short Hills, and Stanley Lipowski, Newark, N.J., assignors to Nopco Chemical Company, Harrison, N.J., a corporation of New Jersey
No Drawing. Filed Nov. 4, 1957, Ser. No. 694,128
9 Claims. (Cl. 260—69)

This invention relates, in general, to a new and improved class of synthetic tanning agents. More particularly, this invention relates to novel cationic aminoplast resin compositions and to a process for producing same.

Dicyandiamide-formaldehyde condensation products, and the processes by which they are produced, are quite well known in the art. Thus, for example, German Patent 323,665 relates to compositions produced by reacting dicyandiamide and formaldehyde in the presence of sulfuric acid. German Patent 325,647 discloses that compositions of the type produced in accordance with German Patent 323,665 can be prepared in the absence of sulfuric acid by the simple expedient of prolonged heating. That patent also discloses that the condensation can be facilitated by the use of condensing agents other than sulfuric acid. On the other hand, U.S. Patent 2,567,238 relates to compositions produced by the condensation of dicyandiamide and formaldehyde in the presence of an alkali. In British Patent 314,358, it is disclosed that a resinous composition can be obtained by heating dicyandiamide, urea and formaldehyde, followed by the addition thereto of an acid and by additional heating.

Since, as will be seen from the description of the invention which follows hereinafter, the present products are prepared using dicyandiamide, formaldehyde and urea, it may at first glance appear as though such products are similar or comparable to those described in the foregoing references. It has been conclusively established that this is not the case. The products of this invention are, by virtue of the method by which they are produced, different than the products of the art. The detailed description of our invention will make it manifestly clear wherein and in what respects our products, and their properties, differ from those of the art.

It is the object of this invention to provide a new and improved class of synthetic tanning agents.

A further object of the invention is to provide cationic aminoplast resin compositions which are soluble, and completely stable, in water and which possess properties that make them well suited for use in the tanning of leather.

A more particular object of the invention is to provide an economical and commercially feasible process for producing such resin compositions.

Other objects of this invention will be obvious and will in part appear hereinafter.

It has been discovered that extremely valuable synthetic tanning agents can be produced by (1) reacting dicyandiamide and formaldehyde, under the controlled conditions to be enumerated fully hereinafter, and (2) thereafter reacting the product thus obtained with urea.

In carrying out the first step of our invention, dicyandiamide and formaldehyde are charged initially into a reaction vessel and intimately admixed. As the source of formaldehyde, formalin, which is an approximately 37% by weight aqueous solution of formaldehyde, is preferably employed. However, formaldehyde in any of its polymeric forms, as, for example, paraformaldehyde, trioxane, etc. can be employed. When used, paraformaldehyde, trioxane, etc. can be added to water and subsequently mixed with dicyandiamide. In the alternative, one could add paraformaldehyde, trioxane, etc. directly to a dicyandiamide-water mixture without departing from the scope of the invention. Thus, where the term formaldehyde is used herein it should be construed as encompassing formalin as well as polymeric forms of formaldehyde.

After the dicyandiamide and aqueous formaldehyde are mixed, a quantity of acid, sufficient to reduce the pH of the mixture to at least about 2.5, is added to the mixture. As will be pointed out more fully hereinafter, the acid serves as a catalyst for the reaction. The acidified reaction mixture is then heated carefully to a temperature at which the reaction commences. The condensation reaction, itself, is exothermic in nature and once initiated it will proceed to a point of substantial completion without the application of external heat. It has been found that the exothermic reaction will be initiated by heating the reaction mixture carefully to a temperature within the range of from about 55° C. to about 80° C. The beginning of the reaction will be evidenced by a rapid rise in the temperature of the reaction mass. When this rapid rise occurs, the source of external heat is removed from contact with the reaction vessel and the reaction is allowed to proceed without additional heating. In most instances, temperatures which are at or near the boiling point of the reaction mixture, that is, about 96° C. will be developed by the exothermic reaction. It may be necessary, at times, to cool the reaction mixture intermittently by some suitable means, to prevent the reaction temperature from rising too rapidly. Cooling may be necessary, also, to prevent the reaction mixture from rising to a temperature above about 96° C. For the most part, however, cooling will be required only in plant scale production where, because of the size of the reaction mass, the heat developed by the reaction is not readily dissipated.

The exothermic reaction, described above, accompanied as it is by a rapid rise in temperature, has the appearance at the outset of being quite violent. After a short period of time, however, the reaction rate subsides and a gradual decrease in the reaction temperature will be observed. It has been determined that at this point in the process the condensation of dicyandiamide and formaldehyde is substantially complete. One could proceed immediately to the next step in the process, if desired. However, in the preferred embodiment of the invention, the reaction mixture is heated at reflux for an additional period of time. While the reaction mixture can be refluxed for a period of up to about 5 hours, ordinarily, no practical purpose will be served by heating the mixture at reflux for more than about 2 hours.

During the course of the dicyandiamide-formaldehyde reaction, the reaction mixture must be maintained at an acid pH. A rise in the pH of the mixture will, however, be observed during the reaction. The increase in pH will be most noticeable during the initial stage of the exothermic reaction with an increase from the original pH, as, for example, about pH 2.5, to up to about pH 6.0 being a common occurrence. The rise in pH which occurs during the subsequent refluxing step of the preferred procedure will be relatively quite small. Under ordinary circumstances, additional refluxing will not raise the pH of the reaction mixture above pH 7.0. Generally, additional refluxing will not raise the pH of the reaction mixture above about pH 6.5. In any event, however, care should be taken during this particular step in our process to prevent the pH of the reaction mixture from rising above pH 7.0. To this end, additional quantities of acid can, and should, be added to the reaction mixture, when and if needed.

When the acid-catalyzed, dicyandiamide-formaldehyde condensation reaction is complete, urea is added to the reaction mixture and refluxed therewith. This refluxing period can be varied. However, it has been found that refluxing the reaction mixture for a period of from about thirty minutes to about one hour is usually sufficient. The amount of urea employed is to some extent critical. One should use an amount equivalent at least to the quantity of urea theoretically required to react with all of the unreacted formaldehyde present in the reaction mixture to form monomethylol urea. In any particular instance, the quantity of urea to be employed can be calculated readily. This can be accomplished by initially determining the amount of unreacted formaldehyde present in the reaction product. The quantitative formaldehyde determination can be made by any appropriate means, as, for example, by conventional prior art titration procedures. Having determined the quantity of unreacted formaldehyde present, one can very easily calculate the quantity of urea needed to form therewith monomethylol urea. It should be noted that, although the amount of urea to be used is calculated on the basis of the quantity of urea theoretically required to form monomethylol urea with the unreacted formaldehyde present, no attempt has been made to ascertain definitely whether the methylol urea compound formed during refluxing is, in fact, the monomethylol compound. It is quite possible that dimethylol urea is produced. However, it is considered more likely that a mixture of monomethylol urea and dimethylol urea is formed. From this it can be seen that, for our purposes, the presence of unreacted urea in the final product of the invention is not at all detrimental. For when, in making the calculation for urea, it is assumed that monomethylol urea is formed, the use of the maximum quantity of urea that could be needed is provided for. If, in fact, dimethylol urea is formed, either as the sole methylol urea compound or in admixture with monomethylol urea, the final product will contain a quantity of free urea. The presence of unreacted urea in the products of the invention will not alter the properties thereof. As a general rule, it will be found that from about 0.5 to about 1.0 mole of urea will be required for each mole of dicyandiamide originally employed.

The quantity of dicyandiamide and formaldehyde used in the practice of the invention disclosed herein represents a critical limitation on the scope of the invention. A sufficient quantity of aqueous formaldehyde should be used to provide the reaction system with a ratio of from about 2.5 to about 3.5 moles of formaldehyde for each mole of dicyandiamide present. Preferably, however, about 3.0 moles of formaldehyde will be used for each mole of dicyandiamide present. It has been found that if the molar ratio of formaldehyde to dicyandiamide is lower than 2.5 to 1, the product produced by reacting the dicyandiamide-formaldehyde reaction product with urea will be discolored or will, on standing, tend to discolor. On the other hand, if the molar ratio of formaldehyde to dicyandiamide that is used is higher than 3.5 to 1, a cloudy and relatively unstable final product will be obtained.

As indicated heretofore, we add to the dicyandiamide-formaldehyde reaction mixture a quantity of acid sufficient to reduce the pH thereof to at least about 2.5. Preferably, however, we add a quantity of acid sufficient to reduce the pH of the mixture to within the range of from about 1.5 to 2.5. Moreover, as we have stated previously, an acid pH, that is, a pH below about 7.0, must be maintained throughout the condensation of dicyandiamide with formaldehyde. In general, any low molecular weight aliphatic monocarboxylic acid, dicarboxylic acid, tricarboxylic acid or hydroxy carboxylic acid can bet used initially as the acid catalyst or added to the reaction mixture during refluxing to maintain the required acid pH. Thus, for example, one may use formic acid, acetic acid, butyric acid, oxalic acid, malonic acid, glutaric acid, citric acid, lactic acid, glycolic acid, etc. In the preferred embodiment of the invention, however, formic acid is employed.

The products obtained by refluxing the dicyandiamide-formaldehyde reaction product with urea require little or no special after-treatment. However, the product should be adjusted, if necessary, with either an acid or an alkali, such as, sodium hydroxide, to a pH within the range of 6.0 to 7.0. Ordinarily, the products of the invention will be clear, water-white syrupy compositions which are soluble in cold water. Moreover, since aqueous formaldehyde solutions are used in their preparation, the products obtained will contain considerable quantities of water.

The aminoplast resin type compositions produced in the practice of this invention are cationic in character. They are indefinitely stable in liquid form and they are not acid-sensitive, that is, they do not precipitate in the presence of weak or relatively strong acid media, such as, oxalic acid, formic acid, acetic acid, dilute sulfuric acid, dilute hydrochloric acid, dilute nitric acid, etc. These products will be precipitated from aqueous solution, however, by adding thereto an anionic resin, such as, a naphthalene sulfonic acid condensate, a phenol sulfonic acid condensate, etc.

The products of the invention are extremely well suited for use in the tanning of leather. Our novel resins show a remarkable affinity to the collagen of the bated pelts of hides and skins and are readily taken up above the isoelectric point of the collagen. When used alone, the products of this invention give a white, plump, light-stable piece of leather with a relatively high shrinkage temperature, that is, a shrinkage temperature above about 83° C. These products are outstanding in that they are very well suited for use as white leather tannage. White leather which is treated with the products of this invention will be found to be much plumper than white leather treated with conventional mineral or aldehyde tannages. Furthermore, in contrast to leathers which have been treated with phenolic-type synthetic tanning agents, white leathers treated with our products will be completely light-stable, that is, they will neither darken, nor tend to darken, when exposed to light. Moreover, the present products have been found to be extremely useful both in the pre-treatment of hides and skins which are to be vegetable tanned and in the after-treatment of vegetable tanned hides and skins. The products of the invention are readily taken up in vegetable tannages which are anionic in nature. As a result the appearance, strength, and hand of the leather as well as its resistance to perspiration can be greatly improved by the pre-treatment or after treatment of vegetable tanned-leather with the present products. Moreover, the products of the invention can be used successfully for filling of chrome tanned hides, either alone or as a topping after pretreatment with anionic compounds, such as, naphthalene sulfonic acid condensates, phenol sulfonic acid condensates, lignin sulfonic acid, anionic aminoplast resins, etc. Furthermore, a shrunken grain effect, which is obtained by treating leather either with astringent phenolic-type synthetic tanning agents or with vegetable tanning agents, will be more permanently fixed when the products of this invention are employed in conjunction with an anionic compound in the treatment of such leathers.

However, the utility of the products of the invention is not limited to the tanning industry. They can be used also, for example, in the textile industry as water-proofing and anti-crease agents. In addition, the present products can be used as a flocculant in the treatment of waste waters.

For a fuller understanding of the nature and objects of this invention, reference may be had to the following examples which are given merely as further illustrations of the invention and are not to be construed in a limiting sense. All parts given in the examples are parts by weight unless indicated to the contrary.

*Example 1*

In this example, 84.0 parts (1.0 mole) of dicyandiamide, 230 parts of aqueous formaldehyde (37%) solution (2.8 moles of formaldehyde) and 15 parts of formic acid were charged into, and mixed in, a vessel. The mixture had a pH of 2.0. The mixture was slowly heated, with continuous stirring, until a temperature of about 60° C. was reached. At this temperature, a rapid, spontaneous temperature rise was noted. External heating was discontinued immediately. The reaction temperature rose rapidly to the boiling point of the mixture. The reaction remained at its boiling point for a short period of time. Thereafter, the temperature began to subside. At this point in the process the pH of the reaction mixture was about 5.5. External heating was applied once again and the mixture was refluxed for about three and one-half hours. At the end of that time, the reaction mixture, which now had a pH of about 6.5, was cooled to a temperature of about 70° C. and 30.0 parts of urea were added thereto. This mixture was then heated at reflux temperature for about one-half hour.

At the end of that time, the reaction mixture (pH=7.0) was cooled to room temperature. The product was a clear, water-white syrup having a solids content of about 50% by weight. It was soluble in water and it was not sensitive to weak or relatively strong acids.

The product of this example was evaluated as follows: Bated calf-skins were first completely delimed using ammonium sulphate and subsequently washed thoroughly with water. The skins were placed in a rotatable drum containing a quantity of water equal in weight to the weight of the skins and 10% by weight, based on the weight of the skins, of the product of this example. This solution, hereinafter called the float, was at a temperature of about 25° C. The skins were drummed, that is, rotated in the float, for a period of about four hours, after which an additional 10% by weight of the product of this example was added to the float. Drumming was then continued for another six hours. Thereafter, the skins were removed from the float, horsed for about 48 hours to fix the tannage, washed thoroughly with water and finally fat-liquored, first with 1% by weight of a nonionic oil and then with 2% by weight of a sulfate oil. The skins were finished in a conventional manner. White, soft, very full and light-stable leather, having a shrinkage temperature of 84° C., was obtained.

The product of the example was evaluated also for use in conjunction with an anionic tanning agent. In this instance, bated calfskins, previously completely delimed and washed, were once again employed. The bated skins were drummed, for a period of about two hours, in a float comprising a quantity of water equal in weight of the weight of the skins and 10% by weight, based on the weight of the skins, of the product of the example. Thereafter, a 20% aqueous solution of an anionic tanning agent, namely, a sulfated aminoplast resin, was added slowly over a period of about one hour to the same float. The quantity of anionic compound added was equivalent to 2.5% of the weight of the skins. A cloudy precipitate formed when the anionic compound was run into the cationic float. This precipitate was dispersed by the rotating action of the drum and was taken up by the skins. Drumming was continued for a period of about ninety minutes after all of the anionic compound was added. Thereafter, the skins were removed from this float and drummed in another float comprising water, the weight of which was equal to about 50% by weight of the weight of the skins and 1% by weight, based on the weight of the skins, of formic acid. The skins were drummed for about five minutes following which 1.1% by weight, based on the weight of the skins, of potassium dichromate, in the form of 15% aqueous solution, was added thereto. The skins were then drummed for about 90 minutes. Thereafter, the float was changed with fresh water, the weight of which was equal to the weight of the skins, 5% by weight, based on the weight of the skins, of sodium sulphite and 2% by weight, based on the weight of the skins, of formic acid being added to the drum. The skins were drummed in this float for about 15 minutes after which an additional 2% by weight, based on the weight of the skins, of formic acid was added to the solution. The skins were drummed for an additional thirty minutes in this solution. At the end of that period of time, the skins were horsed for a period of 48 hours to fix the tannage and then finished in the conventional manner. A full, pliable piece of leather with a shrinkage temperature of about 92° C. was obtained.

To demonstrate the utility of the product of this example in the after-treatment of chromed tanned hides, the following procedure was carried out. Chromed tanned cowhides were washed, neutralized and treated with 3% by weight, based on the weight of the hides, of a synthetic tanning agent of the naphthalene sulfonic acid type. The hides were then washed with water and treated with 5% by weight, based on the weight of the hides, of the product of this example. Our product was added in the form of a dilute aqueous solution. The hides were then finished in the usual manner. A leather of superior fullness, especially in the looser parts of the hides, was obtained.

*Example II*

In this example, 84.0 parts (1.0 mole) of dicyandiamide, 270 parts of aqueous formaldehyde (37%) solution (3.3 moles of formaldehyde) and 60 parts of glycolic acid (70%) were charged into, and mixed in, a vessel. This mixture had a pH of 1.8. It was then heated carefully, with constant stirring, until a temperature of about 80° C. was reached. At this temperature, a rapid, spontaneous temperature rise was noted. External heating was immediately discontinued. The reaction mixture rose to, and, for a short period of time, remained at, its boiling point. Thereafter, the reaction temperature began to subside. At this point in the process, the pH of the reaction mixture was 4.0. External heating was applied once again, with the product being refluxed for a period of about two hours. At the end of that period of time, the reaction mixture, which now had a pH of 4.5, was cooled to a temperature of about 70° C. Forty parts of urea were added to, and refluxed with, the reaction mixture for about thirty minutes.

The product (pH=5.5) was then cooled to room temperature and its pH was adjusted with sodium hydroxide to pH 7.0. A clear, water-white syrup which was completely soluble in cold water was obtained.

The product of this example was evaluated in precisely the same manner as was the product of Example I. Bated calfskins were tanned using the present product. A white, soft, very full and light-fast leather, having a shrinkage temperature of about 84° C. was obtained. Moreover, the product was used in combination with a sulfated aminoplast resin, in the manner described in Example I, in the treatment of bated calfskins. A full, pliable piece of leather having a shrinkage temperature of about 92° C. was obtained. Furthermore, the product of the example was used in the after-treatment of chrome-tanned cowhides in the manner described in Example I. A hide of superior fullness was obtained.

*Example III*

In this example, 84.0 parts (1.0 mole) of dicyandiamide, 270 parts of aqueous formaldehyde (37%) solution (3.3 moles of formaldehyde) and 11.5 parts of lactic acid (80%) were charged into, and stirred in, a vessel. The pH of the mixture was 2.5. The mixture was then heated slowly, with continuous stirring. At a temperature of about 80° C., the exothermic reaction, accompanied by a rapid rise in temperature, commenced. External heating was discontinued immediately. The reaction developed a temperature near the boiling point of the reaction mixture. After a short period of time, the temperature began to recede. At this point in the process, the reaction mixture had a pH of 4.0. External heating was applied once again and the product was refluxed for a period of about five hours. At the end of that period of time, the reaction mixture, which then had a pH of 5.0, was cooled to a temperature of about 80° C. Thirty parts of urea were then added thereto. This mixture was refluxed for about thirty minutes.

The product (pH=5.5) was cooled to room temperature and its pH was adjusted to 7.0 with sodium hydroxide. A clear, water-white, syrup was obtained. The product contained about 50% of water, was completely soluble in cold water and was not sensitive to weak or even relatively strong acids, as, for example, formic acid.

The product of this example was evaluated for use by the methods described in Example I. Bated calfskins were tanned with outstanding success using this product alone and using the product in combination with a sulfated aminoplast resin. Moreover, superior results were obtained when the product of this example was used, as described in Example I, to treat chrome tanned cowhides which had been treated with an anionic naphthalene sulfonic acid type tanning agent.

Having described our invention what we claim is new and desire to secure by Letters Patent is:

1. A process for preparing a cationic aminoplast resin which comprises the steps of mixing water, formaldehyde and dicyandiamide with a low molecular weight carboxylic acid selected from the group consisting of saturated aliphatic water-soluble mono- and poly-carboxylic acids and water-soluble hydroxy mono- and poly-carboxylic acids present in catalytic amounts sufficient to maintain the pH of the resulting aqueous reaction mixture at between about 1.5 to 2.5, condensing said formaldehyde and dicyandiamide in substantial amounts by heating at a temperature of about 96° C. and thereafter maintaining said temperature for an additional period of up to about 5 hours while maintaining the pH of the reaction mixture below about pH 7.0, thereafter adding urea to the resulting condensation product of said formaldehyde and dicyandiamide in an amount sufficient to react with excess formaldehyde present and heating the mixture thus obtained at a temperature of about 96° C. for about ½ to about 1 hour, the formaldehyde and dicyandiamide being present in amounts to provide the initial reaction mixture with a ratio of from about 2.5 to 3.5 mols of formaldehyde for each mol of dicyandiamide and the water being present in an amount to provide for a water : formaldehyde weight ratio of about 63:37.

2. A process for preparing a cationic aminoplast resin which comprises the steps of mixing water, formaldehyde and dicyandiamide with a low molecular weight carboxylic acid selected from the group consisting of saturated aliphatic water-soluble mono- and poly-carboxylic acids and water-soluble hydroxy mono- and poly-carboxylic acids present in catalytic amounts sufficient to maintain the pH of the resulting aqueous reaction mixture at between about 1.5 to 2.5, condensing said formaldehyde and dicyandiamide in substantial amounts by heating at a temperature of about 96° C. and thereafter maintaining said temperature for an additional period of up to about 5 hours while maintaining the pH of the reaction mixture below about pH 7.0, thereafter adding urea to the resulting condensation product of said formaldehyde and dicyandiamide, heating the mixture thus obtained at a temperature of about 96° C. for about ½ to about 1 hour, the formaldehyde and dicyandiamide being present in amounts to provide the initial reaction mixture with a ratio of from about 2.5 to 3.5 mols of formaldehyde for each mol of dicyandiamide, the water being present in an amount to provide for a water:formaldehyde weight ratio of about 63:37 and the urea being present in an amount of from about 0.5 to 1.0 mol per mol of dicyandiamide.

3. A process for preparing a cationic aminoplast resin comprising the steps of mixing an approximately 37% by weight aqueous formaldehyde solution and dicyandiamide with a low molecular weight carboxylic acid selected from the group consisting of saturated aliphatic water-soluble mono- and poly-carboxylic acids and water-soluble hydroxy mono- and poly-carboxylic acids present in catalytic amounts sufficient to maintain the pH of the resulting aqueous reaction mixture at between about 1.5 to 2.5, condensing said formaldehyde and dicyandiamide in substantial amounts by heating at a temperature of about 96° C. for an additional period of up to about 5 hours while maintaining the pH of the reaction mixture below about pH 7.0, thereafter adding urea to the resulting condensation product of said formaldehyde and dicyandiamide and heating the mixture thus obtained at about 96° C. and thereafter maintaining said temperature for about ½ to about 1 hour, the aqueous formaldehyde and dicyandiamide being present in quantities to provide about 3.0 moles of formaldehyde for each 1.0 mol of dicyandiamide and the urea being present in an amount of from about 0.5 to 1.0 mol of urea for each mol of dicyandiamide.

4. A cationic aminoplast resin produced by mixing water, formaldehyde and dicyandiamide with a low molecular weight carboxylic acid selected from the group consisting of saturated aliphatic water-soluble mono- and poly-carboxylic acids and water-soluble hydroxy mono- and poly-carboxylic acids present in catalytic amounts sufficient to maintain the pH of the resulting aqueous reaction mixture at between about 1.5 to 2.5, condensing said formaldehyde and dicyandiamide in substantial amounts by heating at a temperature of about 96° C. and thereafter maintaining said temperature for an additional period of time up to about five hours while maintaining the pH of the reaction mixture below about pH 7.0, thereafter adding urea to the resulting condensation product of said formaldehyde and dicyandiamide in an amount sufficient to react with excess formaldehyde present and heating the mixture thus obtained at a temperature of about 96° C. for about ½ to about 1 hour, the formaldehyde and dicyandiamide being present in amounts to provide the initial reaction mixture with a ratio of from about 2.5 to 3.5 mols of formaldehyde for each mol of dicyandiamide and the water being present in an amount to provide for a water:formaldehyde weight ratio of about 63:37.

5. A cationic aminoplast resin produced by mixing water, formaldehyde and dicyandiamide with a low molecular weight carboxylic acid selected from the group consisting of saturated aliphatic water-soluble mono- and poly-carboxylic acids and water-soluble hydroxy mono- and poly-carboxylic acids present in catalytic amounts sufficient to maintain the pH of the resulting aqueous reaction mixture at between about 1.5 to 2.5, condensing said formaldehyde and dicyandiamide in substantial amounts by heating at a temperature of about 96° C. and thereafter maintaining said temperature for an additional period of time up to about five hours while maintaining the pH of the reaction mixture below about pH 7.0, thereafter adding urea to the resulting condensation product of said formaldehyde and dicyandiamide, heating the mixture thus obtained at a temperature of about 96° C. for about ½ to about 1 hour, the formaldehyde and dicyandiamide being present in amounts to provide the initial reaction mixture with a ratio of from about 2.5 to 3.5 mols of formaldehyde for each mol of dicyandiamide, the water being present in an amount to provide for a water:formaldehyde weight ratio of about 63:37 and the urea being present in an amount of from about 0.5 to 1.0 mol per mol of dicyandiamide.

6. A cationic aminoplast resin produced by mixing an approximately 37% by weight aqueous formaldehyde solution and dicyandiamide with a low molecular weight carboxylic acid selected from the group consisting of saturated aliphatic water-soluble mono- and poly-carboxylic acids and water-soluble hydroxy mono-and poly-carboxylic acids present in catalytic amounts sufficient to maintain the pH of the resulting aqueous reaction mixture at between about 1.5 to 2.5, condensing said formaldehyde and dicyandiamide in substantial amounts by heating at a temperature of about 96° C. and thereafter maintaining said temperature for an additional period of time up to about five hours while maintaining the pH of the reaction mixture below about pH 7.0, thereafter adding urea to the resulting condensation product of said formaldehyde and dicyandiamide and heating the mixture thus obtained at about 96° C. for about ½ to about 1 hour, the aqueous formaldehyde and dicyandiamide being present in quantities to provide about 3.0 moles of formaldehyde for each 1.0 mol of dicyandiamide and the urea being present in an amount of from about 0.5 to 1.0 mol of urea for each mol of dicyandiamide.

7. The product of claim 6 wherein the water-soluble carboxylic acid employed is formic acid.

8. The product of claim 6 wherein the water-soluble carboxylic acid employed is glycolic acid.

9. The product of claim 6 wherein the water-soluble carboxylic acid employed is lactic acid.

References Cited in the file of this patent

UNITED STATES PATENTS 2,870,122    Sellet _____ Jan. 20, 1959

FOREIGN PATENTS 632,936    Great Britain _____ Dec. 5, 1949

UNITED STATES PATENT OFFICE
CERTIFICATE OF CORRECTION

Patent No. 2,990,397            June 27, 1961

Charles A. Fetscher et al.

It is hereby certified that error appears in the above numbered patent requiring correction and that the said Letters Patent should read as corrected below.

Column 8, line 14, strike out "and thereafter maintaining said temperature" and insert the same after "96° C." in line 9, same column 8.

Signed and sealed this 5th day of December 1961.

(SEAL)
Attest:

ERNEST W. SWIDER
Attesting Officer

DAVID L. LADD
Commissioner of Patents
USCOMM-DC